Dec. 20, 1966 E. N. SCHROEDER 3,293,369

CONFERENCE COMMUNICATIONS SYSTEM EMPLOYING TIME DIVISION MULTIPLEX

Filed Dec. 20, 1963 2 Sheets-Sheet 1

INVENTOR.
EUGENE N. SCHROEDER

BY George C. Kuton
AGENT

United States Patent Office 3,293,369
Patented Dec. 20, 1966

3,293,369

CONFERENCE COMMUNICATIONS SYSTEM EMPLOYING TIME DIVISION MULTIPLEX

Eugene N. Schroeder, Bethesda, Md., assignor to International Business Machines Corporation, New York, N.Y., a corporation of New York Filed Dec. 20, 1963, Ser. No. 332,151
12 Claims. (Cl. 179—18)

This invention relates to communications systems. More particularly, the invention relates to a time multiplexed communications system which allows more than two subscribers to share a conversation, that is, have a conference conversation.

The prior art is replete with communications systems which have conferencing capabilities. As those skilled in the art will recognize, existing telephone systems achieve conference connections by connecting the conferee lines in parallel, sometimes via bridging networks which equalize the losses encountered in this type of operation. More extensive conferences require equalizing amplifiers to restore the power losses, and, sometimes to provide an automatic volume control. For large conferences, the required number of amplifiers becomes prohibitive.

Moreover, virtually all of the present-day systems which offer conferencing capabilities, are not of the time multiplexed variety. This, in turn, further limits the number of subscribers to a given system, in addition to limiting the number and size of the conference calls. In other words, deprived of the well-known efficiencies and advantages of time multiplexed communications, and further limited by the extensive hardware requirements, existing communications systems have not been able to provide fully adequate conferencing capabilities at reasonable costs. Furthermore, prior art systems which have provided conferencing facilities have done so with a preconceived limitation on the number of conferees that could be accommodated. Apart from limiting the size of the conference conversations, such schemes frequently also involve the uneconomical use of equipment resulting from the less than total use in those cases where the number of conferees is below the fixed limits of the system.

Accordingly, it is a prime object of this invention to provide a new and improved conference communications system.

It is another object of this invention to provide an improved conference communications system which allows a greater number of more extensive conference calls.

It is still another object of this invention to provide a conference communications system compatible with time division multiplexing systems.

It is yet another object of this invention to provide a conference communications system that is flexible with regard to the number of conference conversations that may exist.

It is fair to characterize time division multiplexing systems as of a type in which a great number of subscribers share one, or several, channels to which they may gain access only for that minimum amount of time necessary to convey information to each other. To prevent chaos, that is to prevent more than two subscribers from, inadvertently or otherwise, gaining access to the channel at the same time, a necessarily rigid set of rules must be followed. Generally, this takes the form of exclusively allocating to each subscriber time slots (within a larger time interval known as a time frame) during which, and only during which, he may gain access to a channel to say what he wants to, or has to say. By its very nature, such exclusive allocation (of time slots or other parameters) is the antithesis of conferencing connections, which require more than two subscribers to simultaneously share a conversation channel.

Accordingly, whenever attempts have been made to provide existing time multiplexed communications systems with conference capabilities, it has generally been found necessary to fully reconstitute the original analog (i.e., speech signal) from the time multiplexed samples thereof, and to use the thus fully reconstituted signal in a manner that is essentially the same as the present day conference systems which provide a continuous analog signal simultaneously to all subscribers.

Accordingly, it is another object of this invention to provide a time division conference system in which reconversion to an analog signal is not necessary to achieve a conference connection.

It is another object of this invention to provide a time division conference system which does not need digital-to-analog converters to provide a conference system.

According to the invention, conference commuications in a time division multiplexing system are achieved by placing the samples from a particular talking subscriber (input circuit) on an extra highway, rather than gating the samples exclusively to a particular output circuit (listening subscriber) which would normally be the case. The signal samples so placed on the conference highway are representative of the signal from the input circuit and they are provided to conference means which accept these samples over an entire time frame and store the resultant accumulated value of the signal samples. At the end of a time frame during which one (or more) input circuits have been each sampled, the composite value of the signals accumulated in the conference means are provided to means within the conference means which take the value of the accumulated signal samples and provide an output signal which endures for the entire time frame subsequent to the time frame in which the signal samples were accumulated.

The output signal so provided from the conference means are reintroduced into the existing time division multiplexing system and, since it endures over substantially the entire time frame, all output circuits, despite their unique and exclusive allocation of time slots within a time frame, will nevertheless have an opportunity to sample the output signal.

In a preferred embodiment of the invention, the output signals provided from the conference box are in the form of a constant level signal whose amplitude represents the composite amplitude of the signal samples stored in the conference means during the previous time frame, thereby representing the information content of the signals supplied by said input circuits.

The foregoing and other objects, features and advantages of the invention will be apparent from the following more particular description of an exemplary embodiment of the invention as illustrated in the accompanying drawings.

*General structure*

Figure 1:
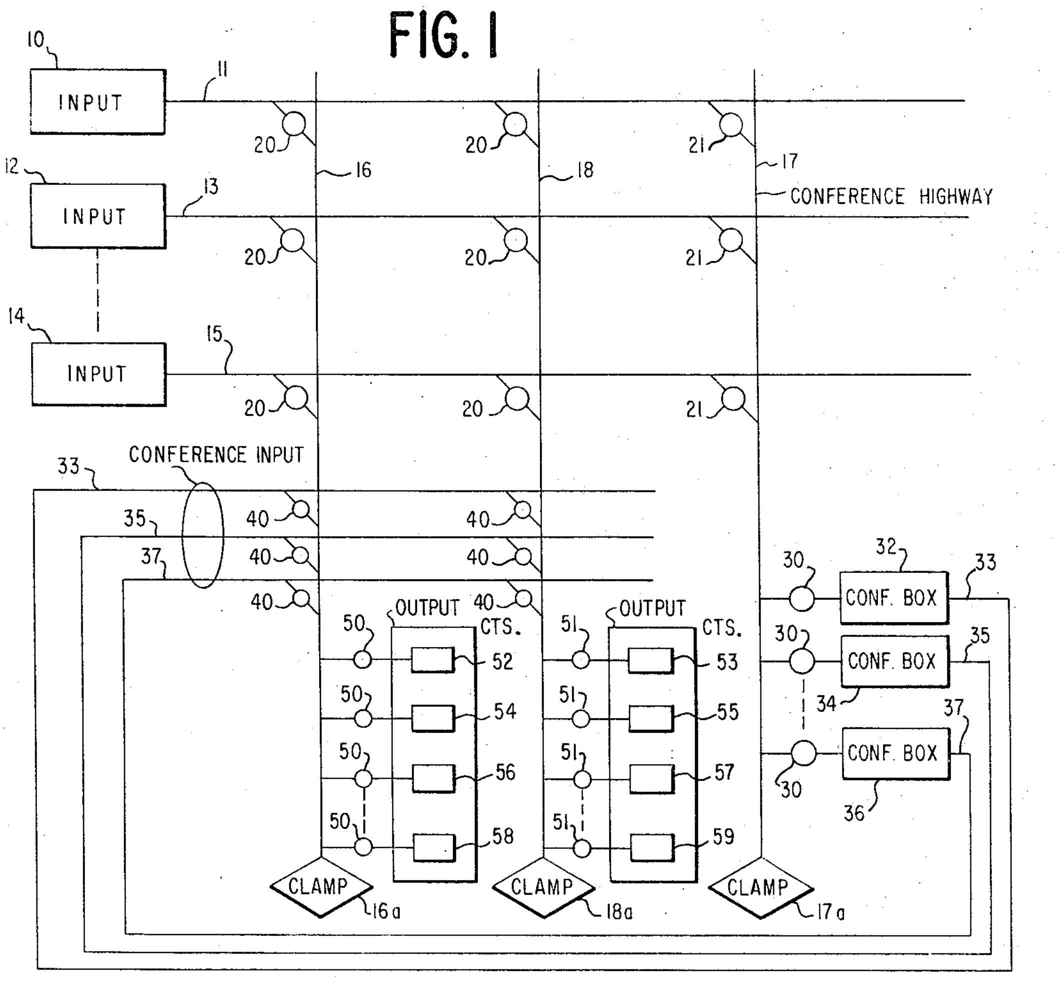
FIG. 1 is a symbolic system diagram of the conference communications system according to the invention.

Referring now to FIG. 1, there is shown a schematic system diagram of a time division multiplexing system embodying the invention.

A plurality of input circuits 10, 12, 14 representing subscribers capable of furnishing analog signals (for example, speech waves) are connected to a matrix of common output highways 16, 18 through a number of selectively operable time gates 20, which interconnect each input circuit 10, 12, 14 and its respective individual highway, 11, 13, 15 with the output highways 16, and 18, which are terminated in respective clamps 16*a* and 18*a* to eliminate disturbances.

The output highways 16 and 18 have also connected thereto a number of output circuits 52–59, with an allocation being made such that output circuits 52, 54, 56, and 58 have access only to highway 16, through selectively operable time gates 50, while output circuits 53, 55, 57 and 59 have access only to highway 18 through seelctively operable time gates 51. The system, as so far described, constitutes the essentials of a representative time division multiplexing (TDM) system.

Figure 1A:
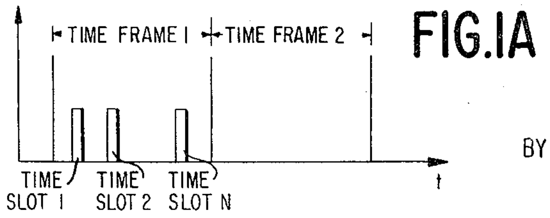
FIG. 1A is a diagram showing the relationship between a number of time slots and several time frames.

The normal operation of a system as described, for communications between any one of the input circuits 10, 12, 14 and any of the output circuits 52–59, is achieved by the unvarying and exclusive allocation of time slots (FIG. 1A) within each time frame, to each respective output circuit 52–59. That is, the gates 50 and 51 are each actuated at least once during each time frame, with repetition over a number of subsequent time frames. The sequence of closing of the time gates 50, 51 is controlled by standard circuitry, such as a ring counter (not shown). Such an allocation of time slots guarantees that each of the output circuits 52–59 has the opportunity to receive any signals transmitted over the highways 16 and 18 at least once every time frame.

Conversation between any of the input circuits and any of the output circuits, e.g., input circuit 10 and output circuit 54, is accomplished by causing the simultaneous closure of that time gate 20 (by means of a program stored in a memory, not shown) which connects input circuit 10 to the highway 16, simultaneously with the closure of that time gate which connects output circuit 54 to the highway 16. As long as the conversation is maintained, the respective time gates 20 and 50 will close in synchronism, over a number of time frames, whereby communications between input circuit 10 and output circuit 54 are achieved.

It should be evident that the exclusive allocation of certain output circuits (e.g., 52, 54 . . . and 53, 55 . . . ) to respective highways 16, 18, with the further proviso of exclusively allocated time slots during which each circuit 52–59 may have access to its respective highway, limits the conferencing capabilities of the system so far described. For example, if it were desired to transmit samples from input circuit 10, that is, the same sample concurrently, to output circuit 54 which may be assigned time slot 1 on highway 16, and output circuit 55, which may be assigned time slot 7 on highway 18, a problem would immediately be presented. The respective output circuits 54, and 55 share neither common time slots, nor common highways so that the sample from input circuit 10 (that is, the analog value of the signal from circuit 10 that is sampled onto the highways 16, 18 by the time gates 20) cannot be delivered concurrently to these two output circuits 54 and 55.

In accordance with the invention therefore, an extra conference highway 17 is provided. Conference highway 17 is connected to the respective input circuits 10, 12, 14 and their respective entering highways 11, 13, 15 by means of conventional time gates 21. On the output side of conference highway 17, a plurality of conference boxes 32, 34, 36 are connected via respective time gates 30. The time gates 30 are selectively operable simultaneously with selected ones of the time gates 21 to gate samples from any of the input circuits 10, 12 . . . into selected ones of the conference boxes 32, 34 . . . . The closing of time gates 30 is not sequential but is in accordance with a program stored in a memory (not shown) and any of the gates 30 may be closed a plurality of times during a time frame.

The conference boxes 32, 34 . . . function to convert the amplitude of the samples thus gated therein by the time gates 30, to a signal wave form which is adapted to be placed onto the respective highways 16 and 18, as a conference input, via the lines 33, 35, 37.

The lines 33, 35, 37 are interconnected with the highways 16 and 18 by a plurality of time gates 40, of the same type as time gates 20, 21, 30, 50 and 51. The output signal provided from any one of the conference boxes 32, 34, 36 is provided on its respective line 33, 35, 37 and reintroduced into the output highways 16 and 18 as a conference input for an interval sufficiently long to give all of the desired output circuits 52–59, which may be in on the conference connection, an opportunity to sample that signal. The signal provided from the conference boxes 32 . . . endure for a complete time frame, and, represent the amplitude of the sample gathered from the particular one of the input circuits 10 during the previous time frame. This will be explained in more detail below.

Figure 2:
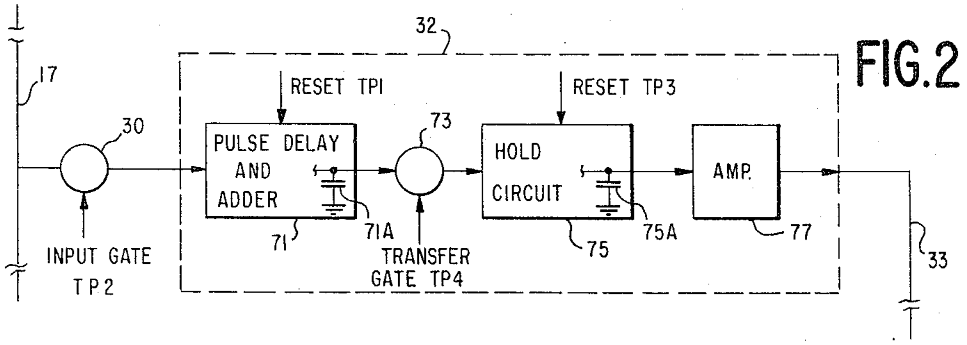
FIG. 2 is a functional block diagram of the conference box employed in the system shown in FIG. 1.

Turning now to FIG. 2, there is shown in more detail circuitry embodied within a representative conference box, e.g., 32.

The conference highway 17 is connected via time gate 30, to a pulse delay and adder circuit 71, which includes a capacitor 71A. The function of the circuit 71 is to accept the amplitude samples gated thereto by time gate 30 from highway 17, and to provide a delaying and adding function so as to be responsive over substantially an entire time frame to accumulate the amplitudes of the signal samples gated thereto from highway 17. This is achieved principally by the inclusion of a storage device such as capacitor 71A from which charge is continuously added, or subtracted, by circuitry which is otherwise conventional and well-known to those skilled in the art. The final voltage accumulated on capacitor 71A at the end of a time frame represents the composite amplitude of the signal samples gated thereto from conference highway 17.

The output voltage developed across capacitor 71A is provided to a transfer gate 73 adapted to sample the thus stored voltage and transfer an indication thereof to hold circuit 75, including a holding capacitor 75A. The primary function of hold circuit 75 and capacitor 75A, is to provide a signal representative of the composite amplitude signal stored in the pulse delay and adder circuit 71 and hold it, for at least one time frame. The voltage on capacitor 75A is provided to a boosting amplifier 77 which, on its output, on line 33, provides the output signal of the conference block 32.

For reasons which will be described below, conference box 32, may, in certain circumstances, advantageously include a conventional type of automatic volume control circuitry interposed between transfer gate 73 and pulse delay and adder circuit 71 in order to prevent the accumulated amplitude of the voltage on capacitor 71A from exceeding those limits above which speech signals could not effectively be recovered.

*General operation*

Turning now to FIGS. 3A–3H, the operation of the system shown in FIGS. 1 and 2 will be described with reference to the characteristic wave form which may typically exist at selected points in the conferencing system according to the invention.

Figures 3A, 3B, 3C, 3D, 3E, 3F, 3G, 3H:
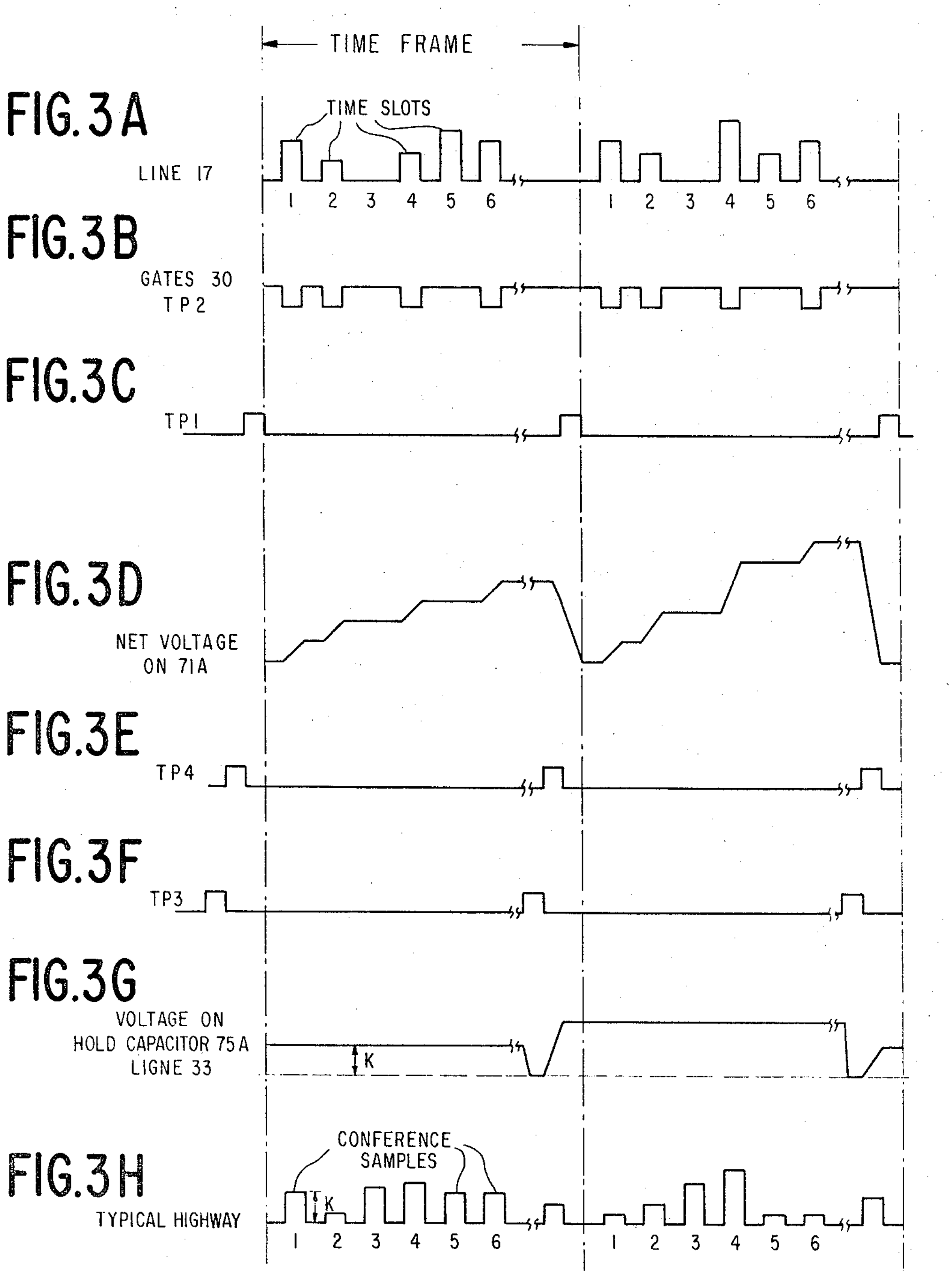
FIGS. 3A to 3H are wave diagrams showing illustrative wave forms in the circuits of FIGS. 1 and 2.

FIG. 3A represents a number of signal samples appearing on the conference highway 17 as a result of the selected closure of time gates 21. Two time frames are shown, and the first time frame has signal samples appearing therein in time slots 1, 2, 4, 5 and 6. Since normally only one time slot per time frame is allocated to any of the input circuits 10, 12, 14 (thereby limiting each input circuit 10, 12, 14, FIG. 1 to only one sample per time frame), the signal wave forms shown in FIG. 3A actually represent the samples from more than one input circuit.

FIG. 3B shows the timing wave form for one of the gates 30 which temporarily connect the conference boxes 32, 34, 36 to the conference highway 17. As shown in FIG. 3B, one of the gates 30, particularly that gate 30 which is associated with conference box 32, is closed during time slots 1, 2, 4 and 6 thereby providing conference box 32 with the corresponding samples shown in FIG. 3A. At this point it should be noted that the ensuing description of the wave forms proceed on the assumption that more than one input circuit is sampled into the same conference box, e.g. 32, during a time frame; this may, at first, create the illusion that confusion is likely to result in such an indiscriminate combination of samples from a number of different talkers. However, it should be remembered that conferenced conversations remain intelligible to the listeners with several subscribers talking simultaneously. In any event, if the situation becomes intolerable, and the signals are so combined that the listeners have trouble understanding what the talking subscribers are saying, the good graces of one or more of the talkers to stop talking can be relied upon. Furthermore, it should also be noted that the situation depicted occurs only for the duration of one time frame, on the order of 100 microseconds. Thus, during a normal phone conversation, which may take as much as five to ten minutes, there will generally be a far greater number of time frames in which a conference box will in fact receive only one sample from one input circuit, so that the total effect on a conversation is almost unnoticeable.

FIG. 3C shows the timing pulses, occurring at the end of each time frame, which are applied to pulse delay and adder circuit 71 to reset that circuit and discharge capacitor 71A to a standard reference level, in preparation for the accumulation of charges during the subsequent time frame.

FIG. 3D shows the voltage accumulating on capacitor 71A in response to the successive pulse amplitude samples (FIG. 3A) gated thereto by the gates 30. As can be seen, the wave form shown in FIG. 3D continually increases, with the gating into circuit 71 of more and more signal samples from line 17. Capacitor 71A is then finally discharged, by the timing pulse TP1 (FIG. 3C) immediately at the end of the time frame.

FIGS. 3E and 3F show timing pulses TP3 and TP4 occurring toward the end of each time frame. Timing pulse 3 (TP3) is applied to hold circuit 75 and functions to discharge capacitor 75A to a standard reference level prior to the beginning of the subsequent time frame. Immediately after timing pulse 3 (TP3) resets the hold circuit 75, the transfer gate 73 is actuated by timing pulse 4 (TP4) which transfers the accumulated amplitude of the voltage stored on capacitor 71A to the hold circuit 75.

FIG. 3G shows the voltage held by capacitor 75A for substantially the duration of an entire time frame. This voltage represents the amplitude of the voltage accumulated by the pulse delay and adder circuit 71 during the previous time frame and is provided, via amplifier 77, and line 33 (FIG. 1) as a conference input to the highways 16 and 18. Since the voltage on capacitor 75A (which represents the information content of the signal samples from the input circuits during the previous time frame), endures for substantially the entire subsequent time frame, opportunity is given each one of the output circuits 52–59 to sample this wave form regardless of the fact that the output circuits occupy, or have allocated thereto, different time slots within the time frame. The sampling occurs in a fashion similar to that previously described for a normal conversation mode of the TDM system shown in FIG. 1. That is, for a conference connection, the selected simultaneous closure of any of the time gates 40 and 50, or 51, will transfer to the output circuits, the samples that are representative of the input wave form from any one of the input circuits 10, 12, 14. The signal wave form produced by conference boxes 32, 34, 36 endures for an entire time frame so that each output circuit which is on the conference connection samples the same wave form, at respectively different time slots within that time frame.

The situation just described is depicted in FIG. 3H, wherein the signal in FIG. 3G is shown as being sampled by a number of output circuits, during different time slots within the same time frame. For example, in FIG. 3H, the conference wave form FIG. 3G is sampled during time slots 1, 5, and 6 which indicates that subscribers occupying those time slots on a particular highway are engaged in the conference conversation. Other output circuits, occupying time slots 2, 3, 4 as shown in FIG. 3H, maintain their own conversation with other input circuits, in a fashion as previously described with reference to FIG. 1. It should be noted that, within the operating rules of the system, gates 40 for a highway are never closed simultaneously with the gates 20. In other words, whenever any of gates 20 are closed for a highway, gates 40 for that highway are not closed, and vice versa.

It should be evident that what has been done is to take samples from an input circuit during a time frame, and creating a new wave form representative of those samples, and causing that wave form to endure for the subsequent time frame so that all output circuits are given an opportunity to sample a delayed version of the sample from the input circuit. Those output circuits which will be included in the conference connection will sample the same wave form, regardless of what particular time slots they are assigned to within a time frame.

While the operation of the invention has been described with reference to only one conference box, it is evident that the system contemplates all of the conference boxes to be used, either simultaneously in that case where all of the subscribers are engaged in the same conference conversation, or separately in that case where a number of conference conversations involving less than all of the subscribers is being carried out. The system may accommodate either situation since the conference boxes are basically of a time multiplexed character.

*Modifications*

While the invention has been described with reference to an exemplary embodiment thereof, a number of obvious modifications may suggest themselves to those skilled in the art. For example, it may in some instances be desirable to include an automatic volume control circuit, interposed between the circuit 71 and the transfer gate 73, to prevent the voltage levels accumulated on capacitor 71A from exceeding the tolerance limits of the system. Such a modification appears necessary however only where the inherent self control of the subscribers breaks down and all the conferees attempt to talk simultaneously. Similarly, it is not likely that only one talking subscriber can persistently use the system at its tolerance limits.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A conference connection system for use in a time multiplexed switching system, comprising:

a plurality of input circuits adapted to provide analog signals;

a conference highway;

a plurality of first time gates, one for each input circuit, connecting said input circuits to said conference highway;

a second plurality of time gates connected to said conference highway;

a plurality of conference boxes, each connected through one of said second plurality of time gates, to said conference highway, whereby upon the simultaneous closure of one of the time gates of each of said first and said second plurality of time gates, the analog signal from one of said input circuits is sampled and provided to one of said conference boxes as a pulse amplitude sample;

means in each of said conference boxes for maintaining the amplitude of said sample as a constant level signal for a predetermined duration subsequent to the reception of a pulse amplitude sample; and means for providing said constant level signal as a conference input to said time multiplexed switching system.

2. The system according to claim 1, wherein each of said conference boxes include:

means for storing said pulse amplitude sample for delayed transfer to said maintaining means, whereby pulse amplitude samples provided to said conference boxes during a first time interval will not be transferred to said maintaining means until the end of said first time interval.

3. A conference connection system for use in a time-multiplexed switching system, comprising:

a plurality of input circuits each adapted to provide an analog signal;

a plurality of output circuits;

a plurality of highways interconnecting said input and said output circuits, with each input circuit having access to all of said highways, said plurality of output circuits being grouped, each output circuit within a group being exclusively allocated for access to only one of said highways;

a first plurality of time gates interconnecting each input circuit with each highway;

a second plurality of time gates, one for each particular output circuit, interconnecting said particular output circuit and one of said highways, whereby upon the selected simultaneous closure of one of said first and said second plurality of time gates a sample of the analog signal from one of said input circuits is transferred via one of said highways to one of said output circuits;

conferencing means for providing a sample of the analog signal of at least one of said input circuits to all of said output circuits including means converting the amplitude of said sample to a constant level signal; and means, including a third plurality of time gates, one for each highway, for transferring said constant level signal for access to all of said highways.

4. A time division conference switching system comprising:

a plurality of input circuits, each input circuit capable of providing analog signals;

a plurality of highways;

a first plurality of time gates, one each for interconnecting each input circuit to each one of the highways, each input circuit being connected to a highway at least once during a time frame by the temporary actuation of its corresponding time gate, whereby a sample of the analog signal of said input circuit is transmitted on said highway;

a plurality of output circuits, said output circuits being exclusively allocated by groups, to only one of said highways;

a second plurality of time gates interconnecting each output circuit with its corresponding highway, each time gate being temporarily closed at least once during said time frame, whereby each output circuit samples any signals appearing on its corresponding highway during at least one time slot within a time frame;

a conference highway;

a third plurality of time gates interconnecting each input circuit with said conference highway, said third plurality of gates being operable during a conference call to transmit analog samples from each input circuit on said conference highway at least once during a time frame for each input circuit;

a plurality of conference boxes connected to said conference highway, each for receiving an analog sample during a first time frame, and including means for maintaining the amplitude of said analog sample as a constant level signal for a subsequent time frame; and means for transmitting said constant level signal to said plurality of output circuits, said last-mentioned means including a fourth plurality of time gates interconnecting said transmitting means with said plurality of highways, whereby said constant level signal is adapted to be sampled onto said plurality of highways during any time slots within said subsequent time frame.

5. System according to claim 4, wherein said conference boxes each comprise:

first means for receiving the analog samples from said conference highway during a first time frame, including means for maintaining the amplitude of said samples for the remaining duration of said first time frame;

second means for producing a constant level output signal; and means for transferring the amplitude of the analog sample stored in said first means to said second means prior to the beginning of said subsequent time frame, whereby the amplitude of said analog sample is converted to a constant level output signal enduring for the subsequent time frame.

6. In a time-division switching system which includes a plurality of input circuits each capable of providing analog signals, being selectively time sampled onto a number of highways at least once during a time frame, and a plurality of output circuits being exclusively allocated, by groups, to only one highway, with each output circuit within a group being allocated at least one exclusive time slot within a time frame for access to said highways, a conference system comprising:

a conference highway;

a plurality of time gates, one each for interconnecting each input circuit with said conference highway, whereby closure of selected ones of said time gates places on said conference highway a series of pulse amplitude samples representing the analog signals from said input circuits;

a plurality of conference boxes;

means for selectively gating said pulse amplitude samples into said conference boxes, each of said conference boxes including means to hold a sample during the time frame in which said gating operation occurs, and means for converting the amplitude of said pulse sample onto a second signal enduring for a subsequent time frame, thereby to allow any of said output circuits to sample said second signal during said subsequent time frame; and means connecting said conference boxes and said highways, whereby said second signal is provided to said highways for sampling by said output circuits any time within said subsequent time frame.

7. A time division conference system according to claim 6, wherein said second signal is a constant level signal unvarying over the substantial duration of said subsequent time frame.

8. In a time-division switching system which includes a plurality of input circuits, each capable of producing analog signals, being selectively time sampled onto a number of highways at least once during a time frame, and a plurality of output circuits, a conference system comprising:

a conference highway;

gating means interconnecting said conference highway with said input circuits for selectively sampling the analog signals from said input circuits at least once during a first time frame for each input circuit, whereby said conference highway transmits a series of pulse amplitude samples representing the analog signals from said input circuits;

conference means connected to said conference highway for receiving said pulse amplitude samples and including means for converting the values of said amplitude samples into a signal wave form enduring for a subsequent time frame; and means for providing said signal wave form to said output circuits, whereby each of said output circuits may sample said signal wave form anytime during said subsequent time frame.

9. The system according to claim 8, wherein said last-mentioned means include:

additional gating means connecting said conference means and said number of highways for selectively sampling said signal wave form from said conference means during said subsequent time frame, whereby said number of highways transmit a series of pulse amplitude samples representing said signal wave form.

10. The system according to claim 8, wherein said signal wave form is a constant level signal.

11. System according to claim 8, wherein said signal wave form is a constant level signal and said conference means include:

first means for storing said pulse amplitude samples received during said first time frame;

second means for holding a constant level signal enduring for a time frame; and means for transferring the amplitude of said samples stored in said first means to said second means prior to the beginning of said subsequent time frame, whereby said second means provides a constant level output signal during said subsequent time frame representative of the amplitude of said samples received during said first time frame.

12. The system according to claim 8, wherein said conference means include means for adding the amplitudes of the pulse amplitude samples received during said first time frame.

References Cited by the Examiner

UNITED STATES PATENTS

| | | | |
|---|---|---|---|
| 2,765,367 | 10/1956 | Homrighous | 179—18.9 X |
| 3,171,900 | 3/1965 | Bartlett | 179—18.9 X |
| 3,204,043 | 8/1965 | Arseneau et al. | 179—19.01 |

KATHLEEN H. CLAFFY, *Primary Examiner.*

L. A. WRIGHT, *Assistant Examiner.*